United States Patent [19]

Arthur

[11] 4,026,245
[45] May 31, 1977

[54] PERSONAL RESTRAINT DEVICE
[75] Inventor: Charles J. Arthur, Pasadena, Calif.
[73] Assignee: Sierra Engineering Co., Sierra Madre, Calif.
[22] Filed: Jan. 21, 1976
[21] Appl. No.: 651,021
[52] U.S. Cl. .............................................. 119/96
[51] Int. Cl.² ...................................... A62B 35/00
[58] Field of Search ........................... 119/96; 2/52
[56] References Cited
UNITED STATES PATENTS

| | | | |
|---|---|---|---|
| 2,130,724 | 9/1938 | Lewis | 119/96 |
| 2,448,076 | 8/1948 | Bradley | 2/52 |
| 2,568,304 | 9/1951 | Schoenbrun | 119/96 |
| 3,424,134 | 1/1969 | Rosenblum | 119/96 |

Primary Examiner—Hugh R. Chamblee
Attorney, Agent, or Firm—D. Gordon Angus; Donald D. Mon

[57] ABSTRACT

A restraining device for use on a small child or person for holding him to a lap seat belt of a seat such as an automobile or airplane seat, comprises a vest provided with an adjustable vest belt attached around the bottom of the vest and buckling in front. A pair of adjustable straps attached at the vest belt at the front pass upward over the shoulders of the wearer and down the back, where they cross each other to the region of the vest belt at the back, where they are fastened. Loops are formed at the lower rear ends of the straps through which an ordinary lap seat belt attached at the seat, may be passed to hold the person to the seat.

6 Claims, 2 Drawing Figures

U.S. Patent  May 31, 1977  4,026,245
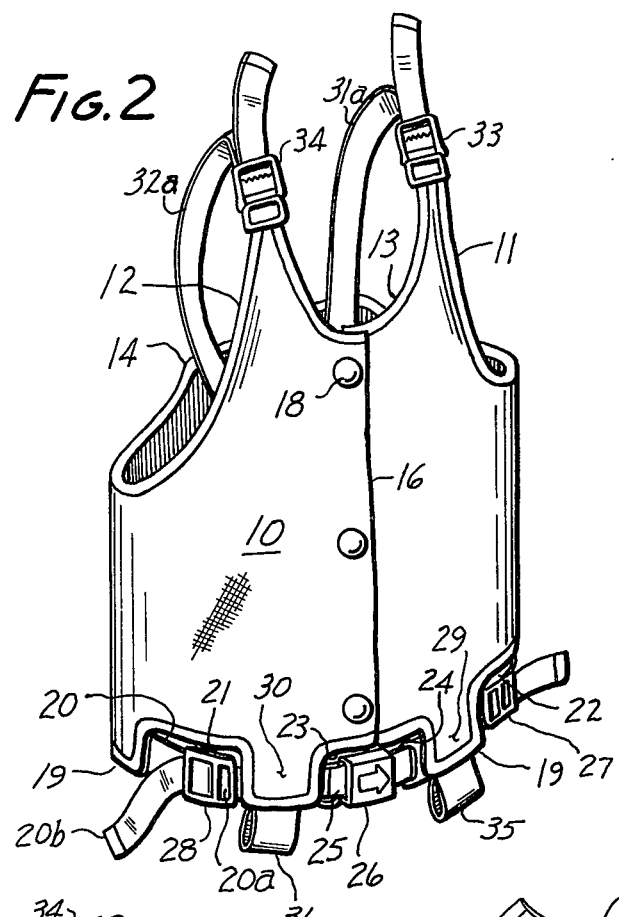
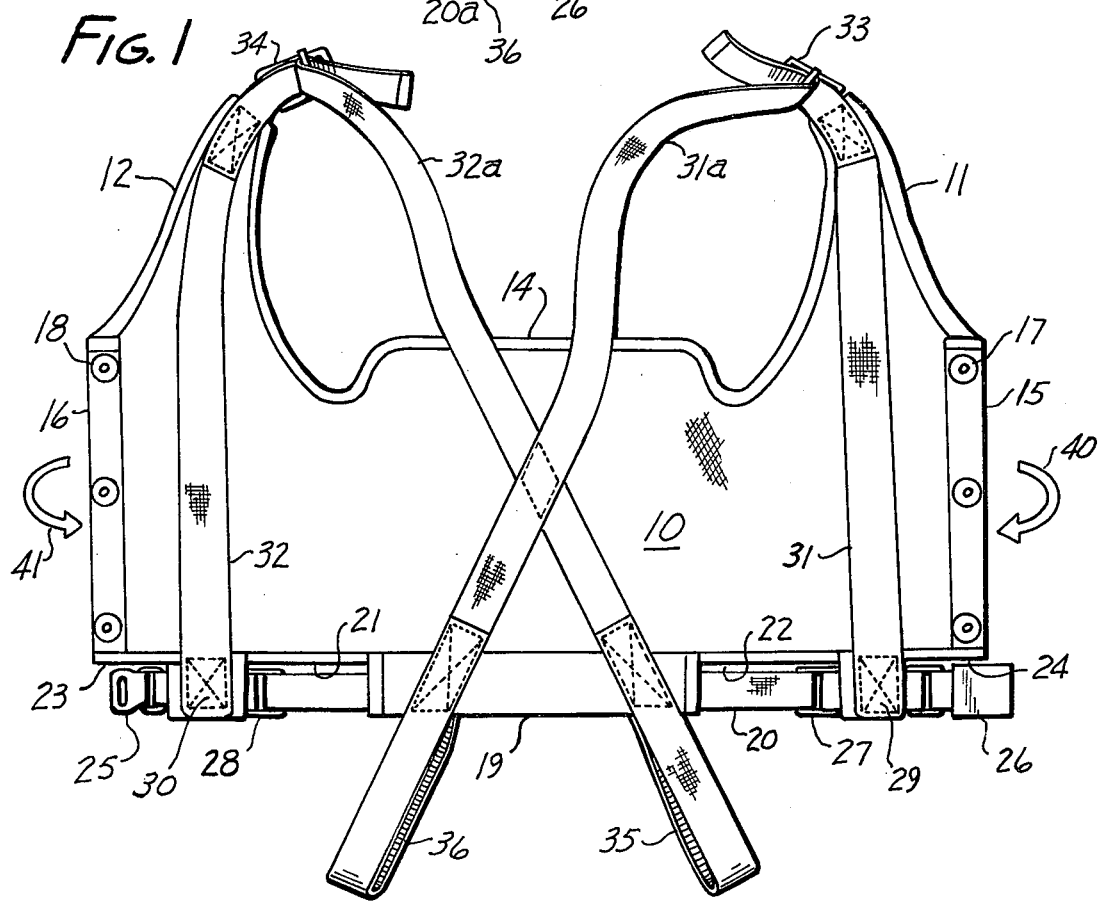

PERSONAL RESTRAINT DEVICE

This invention relates to restraint devices adapted to restrain a person from leaving or pitching from a seat provided with a lap seat belt. The device is particularly applicable to use on small children who may for example be traveling in an airplane or motor vehicle provided with seat belts.

Lap seat belts are common and well-known equipment in vehicles such as airplanes an automobiles. While lap seat belts are relatively effective in restraining adult persons from leaving or pitching from a seat, they are relatively ineffective in restraining a small child. Ordinary lap seat belts have been found to be hazardous and basically non-functional when worn by small children such as 2 to 5 year olds weighing in the order of 20 to 50 pounds. Small children tend to catapult out of such a seat-belt system in an emergency. It is highly desirable that small children be provided with a restraint system which is much more effective than that due to a lap seat belt alone.

An object of the present invention is to provide a restraining device providing relative safety for small people, particularly small children.

The invention is carried out by provision of a vest which can be readily fitted to a small person and attached to a lap-type seat belt. The restraining vest comprises a portion which passes around the torso and is provided with a belt which can be tightened around the abdominal portion of the wearer. The vest is also provided with a shoulder-strap means attached to the vest from a position at the region of the vest belt, which passes upward over the front part of the shoulders and down across the back of the vest, with provision of means for attaching to an ordinary lap seat belt.

A preferred feature resides in provision of means for adjusting the length of the vest belt and of the straps at the shoulder to adapt it to the wearer.

The foregoing and other features of the invention will be better understood from the following detailed description and the accompanying drawing, of which:

FIG. 1 sows a restraining vest according to this invention, shown in its open position, as seen from its inside surface; and FIG. 2 is a view of the vest as seen from the front in its fastened and buckled position as when worn on a person.

The vest comprises a torso portion 10 which should preferably be of a relatively strong garment material, having upwardly extending shoulder portions 11 and 12 which extend upwardly out along the shoulders at the front of the wearer. The front neck portion 13 is cut relatively low so as not to interfere with the throat of the wearer, and the rear upper edge 14 is preferably cut low enough so that it is not positioned upwardly far enough to cover the upper portions of the shoulder blades. The side vertical edges 15 and 16 are preferably reinforced as shown and are provided with mating snap fastener elements 17 and 18. The vest has a lower horizontal edge 19 located, when worn, at the abdominal or mid-torso region of the wearer. At this lower edge there is provided a vest belt 20.

Within each side of the snap fasteners 17, 18 the lower edge of the vest is provided with upwardly extending recesses 21 and 22, respectively, which reveal the vest belt at these positions. The lower edge is also provided with recesses 23 and 24 at its extreme sides so that when the vest is fastened at the front as shown in FIG. 2 the recesses 23 and 24 constitute a combined recess about equal in size to recesses 21 and 22. In FIG. 1, the arrows 40 and 41 indicate how the edges 15 and 16 are carried around to join at the front where they are fastened as shown in FIG. 2. The material around the lower edge of the vest is a heavy strong material which extends around the mid-torso. Material along other edges of the vest is also heavy and strong, including the regions of snap fasteners 17, 18.

The vest belt 20 is securely attached around the lower edge 19 of the vest by suitable stitching or the like and its ends, which appear at the front recess 23, 24 when the vest is fastened at 17, 18, are provided with respective buckle elements 25 and 26 of a well-known type by which the buckling of vest belt 20 can be accomplished by inserting the element 25 into element 26. Release of such a buckle is accomplished in a suitable common manner. In order to adapt the length of the vest belt 20 to the wearer there are provided slides 27 and 28 which may be of a common well-known type. These slides ae located at the recesses 21 and 22 so that they may be readily manipulated. In accordance with a common practice, the vest belt is separated at each slide and one belt end 20a at the separation is fastened to an element of the slide. The other belt end 20b at the separation is passed into the slide and looped around another slide element and then carried back over the belt itself and brought out of the slide between slide elements which function to retain the vest belt in its adjusted position until released by manipulation of the slide.

The recesses 21, 22, 23 and 24 leave areas 29 and 30 of the vest which depend to the line of the lower edge 19. At the inside of the vest at its front, and somewhat spaced from the respective side edges 15 and 16, there are respective front strap portions 31 and 32 which extend upwardly in a substantially vertical direction from the position of respective heavy material areas 29 and 30 along the inside surface of the vest including the respective shoulder portions 11 and 12. These straps are preferably strong webbing type straps and are stitched not only to vest areas 29 and 30, but also to vest belt 20. These straps are fastened not only at areas 29 and 30, but also at the shoulder areas 11 and 12. They may also be stitched to the vest material all the way up from the vest belt to the shoulder areas. At a position above the shoulder areas the strap portions 31 and 32 are provided with respective slides 33 and 34 which function in a manner similar to slides 27 and 28. At these slides 33 and 34 the upper end of each strap portion 31 and 32 is attached to its respective slide, and the ends of mating rear strap portions 31a and 32a are looped through the respective slides in a manner similar to that described in connection with slides 27 and 28. The strap portions 31a and 32a are carried downwardly along the inside surface at the back portion of the vest as illustrated in FIG. 1, in directions which cross each other. These strap portions 31a and 32a are securely fastened as by stitching, to the heavy vest material at the rear lower edge 19 and to the belt 20. These rear strap portions are also stitched together at their crossover, and the stitching preferably continues substantially along the vest material from top to bottom. The ends of the strap portions 31a and 32a terminate in loops 35 and 36 located below the lower edge of the vest, formed by doubling the lower ends of these strap portions back on themselves and stitching at the vest material. The sizes of the loops are such that they can accommodate the width of a lap seat belt with which the vest is to be used.

From the foregoing description of the drawing it is readily apparent how the vest is used. It is placed on the wearer, ordinarily a small child, and the lap seat belt of the seat on which the wearer is sitting is passed through the loops 35 and 36 and buckled up tightly along the seat. The vest is fastened at the front of the wearer by fasteners 17, 18 and the strap portions 31a and 32a are pulled fairly tight at the slides 33 and 34. It is seen that strap portions 31 and 31a constitute, in effect, a single strap and that strap portions 32 and 32a also constitute, in effect, a single strap. Likewise, the vest belt 20 is buckled at buckle elements 25 and 26, and this belt is pulled fairly tight at slides 27 and 28. Under this condition the person wearing the vest is securely restrained from leaving the seat or pitching forward from the seat, by reason of the vest being restrained from its back portion against rising off the seat.

It will be understood that the embodiments of the invention illustrated and described herein are given by way of illustration and not of limitation, and that modifications or equivalents or alternatives within the scope of the invention may suggest themselves to those skilled in the art.

I claim:

1. A personal restraint device comprising:
    a vest portion configured to pass around the torso, having a bottom edge and having side edges which substantially meet at the front when worn;
    fastener means along the side edges adapted to fasten the side edges together at the front of the torso so that the vest is closed at the rear of the torso;
    a vest belt attached along the bottom edge, adapted to encircle the mid-torso, and having ends adapted to meet at the front;
    means at said ends for buckling the vest belt at the front;
    a pair of front strap portions attached at their bottom edges at the front portion of the vest, extending upward along said front portion, and over a respective shoulder, each front strap portion being spaced somewhat from a respective side edge;
    a pair of rear strap portions attached at the bottom edge at the back portion of the vest, extending upward along said back portion to meet and hold to a respective front strap portion;
    the two back strap portions crossing each other; and
    means at the lower end of each back strap portion for holding a lap seat belt fastened across a seat;
    whereby the torso is restrained from leaving the seat.

2. A device according to claim 1 in which the meeting front and back strap paortions are held together by adjustable slides for adjusting strap length.

3. A device according to claim 1 in which the vest belt is provided with adjustable slide means for adjusting the belt length.

4. A device according to claim 1 in which each front strap portion is fixed to the corresponding shoulder portion of the vest.

5. A device according to claim 1 in which the holding means at the bottom of the back strap portions comprise loops of the respective back strap portions through which the lap seat belt may be passed.

6. A device according to claim 5 in which the loops are below the bottom edge of the vest.

* * * * *